US012204312B2

(12) United States Patent
SayyarRodsari et al.

(10) Patent No.: US 12,204,312 B2
(45) Date of Patent: Jan. 21, 2025

(54) DEVICE CONTROL USING PROCESSED SENSOR DATA CORRESPONDING TO UNEXPECTED OPERATIONS

(71) Applicant: ROCKWELL AUTOMATION TECHNOLOGIES, INC., Mayfield Heights, OH (US)

(72) Inventors: Bijan SayyarRodsari, Austin, TX (US); Jakob Methfessel, Muskego, WI (US); Kadir Liano, Pflugerville, TX (US); Hanyu Shi, Austin, TX (US); Dongzuo Tian, Hutto, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 18/366,426

(22) Filed: Aug. 7, 2023

(65) Prior Publication Data
US 2024/0019847 A1 Jan. 18, 2024

Related U.S. Application Data

(63) Continuation of application No. 17/734,670, filed on May 2, 2022, now Pat. No. 11,762,371.

(51) Int. Cl.
*G05B 19/4155* (2006.01)
(52) U.S. Cl.
CPC ............ *G05B 19/4155* (2013.01); *G05B 2219/31368* (2013.01)
(58) Field of Classification Search
None
See application file for complete search history.

(56) References Cited

U.S. PATENT DOCUMENTS 10,101,388 B2   10/2018 Redburn et al.
11,762,371 B1 *  9/2023 SayyarRodsari .. G05B 19/4155
                                                       700/28
(Continued)

FOREIGN PATENT DOCUMENTS

WO    2021241315 A1    12/2021

OTHER PUBLICATIONS

European Search Report; EP Application No. EP23169430; dated Sep. 19, 2023.

*Primary Examiner* — Ryan A Jarrett
(74) *Attorney, Agent, or Firm* — Fletcher Yoder, P.C.

(57) ABSTRACT

A non-transitory computer-readable medium comprising computer-executable instructions that, when executed, cause a processor to perform operations including receiving a first dataset from a first automation component, the first dataset corresponds to raw data acquired by a first sensor; receiving a second dataset from a second automation component, the second dataset corresponds to raw data acquired by a second sensor; receiving data indicating an expected operation related to operations of an industrial automation system including the first and second automation components; determining a signature based on the first and second datasets and the data indicating the expected operation, wherein the signature indicates an unexpected operation as compared to the expected operation; performing a root cause analysis using the signature to determine a relationship indicating a first set of changes of the first dataset corresponding to a second set of changes in the data indicating the expected operation.

18 Claims, 6 Drawing Sheets

(56) References Cited

U.S. PATENT DOCUMENTS

| | | |
|---|---|---|
| 2005/0125710 A1 | 6/2005 | Sanghvi |
| 2020/0103888 A1 | 4/2020 | Sayyarrodsari et al. |
| 2023/0161337 A1* | 5/2023 | Satou .................... G06N 20/00 700/47 |

* cited by examiner

DEVICE CONTROL USING PROCESSED SENSOR DATA CORRESPONDING TO UNEXPECTED OPERATIONS

CROSS REFERENCE TO RELATED APPLICATION

This application is a continuation of U.S. patent application Ser. No. 17/734,670, entitled "Device Control Using Processed Sensor Data Corresponding to Unexpected Operations," filed May 2, 2022, that is incorporated herein by reference in the entirety.

BACKGROUND

The present disclosure generally relates to control systems and, more particularly, to control systems using relationships between unexpected operations and processed sensor data for monitoring, diagnostics, control, and optimization of processes.

Generally, a control system may facilitate performance of an industrial automation process by controlling operation of one or more automation devices. For example, to facilitate performing an industrial automation process, the control system may determine a control action and instruct an automation device (e.g., a rod-pump) to perform the control action. Additionally, the control system may facilitate monitoring performance of the process to determine whether the process is operating as desired. When not operating as desired, the control system may also facilitate performing diagnostics on the process to determine a cause of undesired operation.

In some instances, the control system may utilize a model predictive control (MPC) system to optimize performance of the process by generating and manipulating a process model to transition the process from a current operating state to a desired operating state over a control horizon (e.g., future time steps). However, training the process model may prove to involve an inefficient use of computing resources (e.g., energy, processing power, storage). As such, it may be desirable to provide improved systems and methods for training and retraining the process model in real time or near real time to increase the efficiency in which the industrial automation system operates.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present disclosure relates to a non-transitory computer-readable medium comprising computer-executable instructions that, when executed, are configured to cause a processor to perform operations including receiving a first dataset from a first industrial automation component, wherein the first dataset corresponds to a first processed result of a first raw sensor data acquired by a first sensor. The operations also include receiving a second dataset from a second industrial automation component, wherein the second dataset corresponds to a second processed result of a second raw sensor data acquired by a second sensor. Further, the operations include receiving data indicating an expected operation related to one or more operations of an industrial automation system including the first industrial automation component monitored by the first sensor and the second industrial automation component monitored by the second sensor. Further still, the operations include identifying a signature based on the first dataset, the second dataset, or both, wherein the signature indicates an unexpected operation as compared to the expected operation. Even further, the operations include performing a root cause analysis using the signature to determine a relationship indicating a first set of changes of the first dataset corresponding to a second set of changes in the data indicating the expected operation. Further still, the operations include sending a command to a device associated with the first sensor, the second sensor, or both based on the determined relationship, wherein the command is configured to cause the device to modify an operation.

In another embodiment, the present disclosure relates to a method that includes receiving, via a processor, a first dataset from a first industrial automation component, wherein the first dataset corresponds to a first processed result of a first raw sensor data acquired by a first sensor. The method also includes receiving, via the processor, a second dataset from a second industrial automation component, wherein the second dataset corresponds to a second processed result of a second raw sensor data acquired by a second sensor. Further, the method includes receiving, via the processor, data indicating an expected operation related to one or more operations of an industrial automation system including the first industrial automation component monitored by the first sensor and the second industrial automation component monitored by the second sensor. Further still, the method include identifying, via the processor, a signature based on the first dataset, the second dataset, or both, and the data indicating the expected operation, wherein the signature indicates an unexpected operation as compared to the expected operation. Further still, the method includes performing, via the processor, a root cause analysis using the signature to determine a relationship indicating a first set of changes of the first dataset corresponding to a second set of changes in the data indicating the expected operation. Even further, the method includes sending, via the processor, a command to a device associated with the first sensor, the second sensor, or both based on the determined relationship, wherein the command is configured to cause the device to modify an operation.

In yet another embodiment, the present disclosure relates to a non-transitory computer-readable medium comprising computer-executable instructions that, when executed, are configured to cause a processor to perform operations comprising receiving a first dataset from a first industrial automation component, wherein the first dataset corresponds to a first processed result of a first raw sensor data acquired by a first sensor. The operations also include receiving a second dataset from a second industrial automation component, wherein the second dataset corresponds to a second processed result of a second raw sensor data acquired by a second sensor. Further, the operations include receiving data indicating an expected operation related to one or more operations of an industrial automation system including the first industrial automation component monitored by the first sensor and the second industrial automation component monitored by the second sensor. Further, the operations include identifying a signature based on the first dataset, the second dataset, or both, and the data indicating the expected operation, wherein the signature indicates an unexpected operation as compared to the expected operation. Further still, the operations include performing a root cause analysis using the signature to determine a relationship indicating a first set of changes of the first dataset corresponding to a second set of changes in the data indicating the expected operation. Even further, the operations include sending a command to a device associated with the first sensor, the second sensor, or both based on the determined relationship, wherein the command is configured to cause the device to modify an operation. Further still, the operations include retrieving a model, wherein a device associated with the first sensor, the second sensor, or both, is configured to implement control logical to control operation of the device based on the model. Further still, the operations include updating the model based on the result of the root cause analysis.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
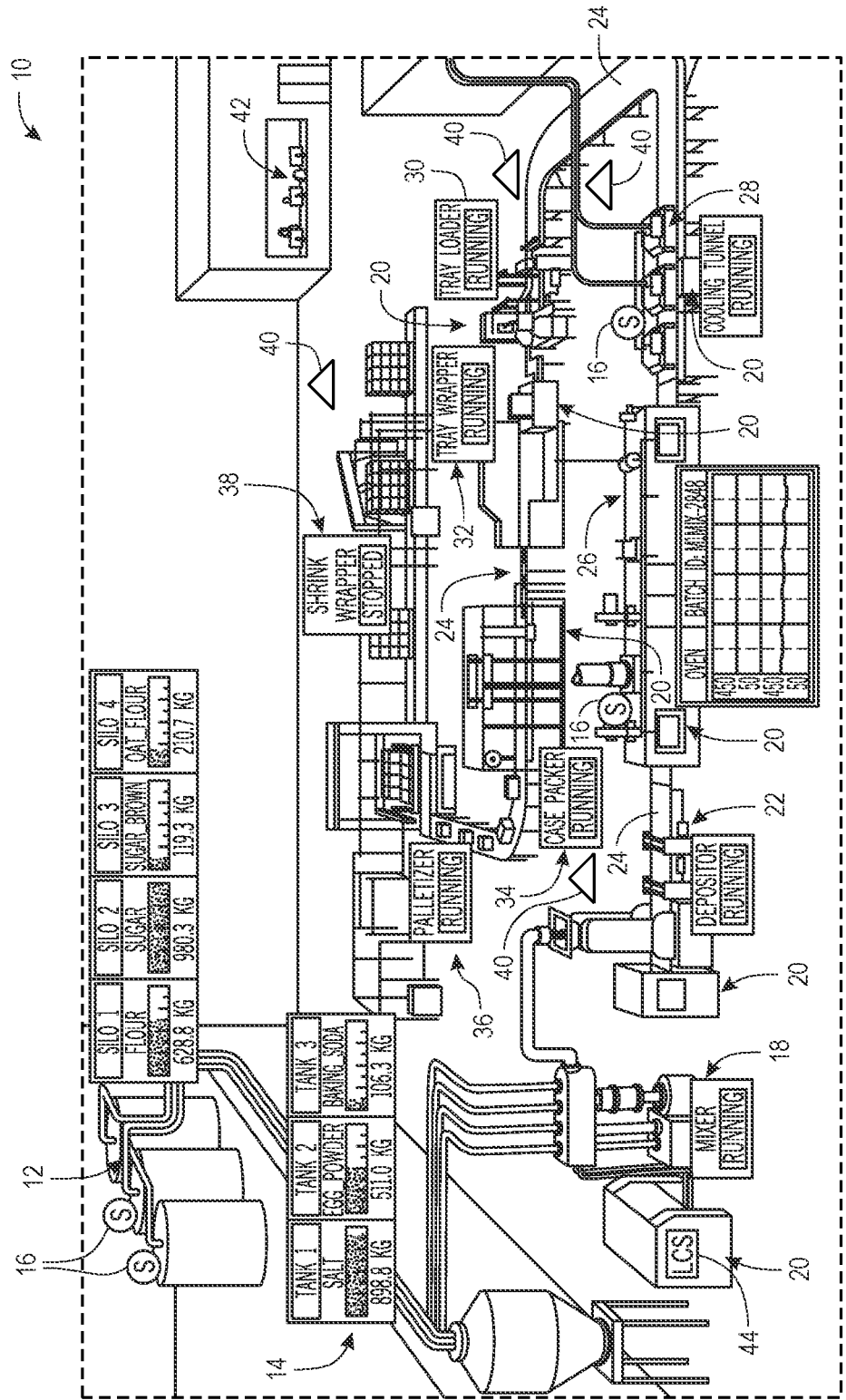
FIG. 1 illustrates an example industrial automation system employed by a food manufacturer, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As discussed above, a control system may control one or more operations of one or more automation devices to facilitate performing an industrial automation process. Industrial automation processes may be used in various contexts, such as a manufacturing plant, a resource extraction system, a hydrocarbon extraction site, a chemical refinery facility, an industrial plant, a power generation system, a mining system, a brewery, or the like. For example, in a resource extraction system context, a control system may control load and position of a rod pump (e.g., an automation device) to perform an oil extraction process. Although examples are provided with regard to specific contexts, one of ordinary skill in the art will recognize that these examples are not intended to be limiting and that the techniques described herein can be used with any suitable context.

To improve operation, the control system may monitor performance of the one or more automation devices and/or the industrial automation process as a whole. For example, the control system may include sensors that measure process data and provide the process data as input to a process model to determine control actions (e.g., control signals) that are used to control operation of the industrial automation process. As used herein, "process data" is intended to describe data indicative of operation of an industrial automation process. For example, the process data may include inputs to the industrial automation process (e.g., process input data), outputs from the industrial automation process (e.g., process output data), disturbance variables (e.g., environmental conditions), constraints on operation, operational parameters (e.g., temperature, speed, load, position, voltage, and/or pressure) of an automation device, and the like.

As mentioned above, a control system may monitor or control the one or more industrial automation devices using a model (e.g., a process model) generated using sensor data measured by sensors. For example, the control system may generate the model by batch processing the sensor data acquired by a number of sensors. As used herein, "batch processing" is intended to describe receiving a batch or collection of information from different related sources (e.g., sensors in a particular portion of the industrial system) and processing the batch of information. In the context of controlling an industrial automation process, the control system may receive sensor data from multiple sensors, store the batch sensor data (e.g., the received data from each of the multiple sources) in a memory, access historical data associated with the sensors, and identify trends and determine control actions to implement using the stored sensor data and the historical data, thereby batch processing the data. In general, batch processing may utilize a relatively large amount of processing capabilities and memory as compared to processing data individually or serially, and thus utilize a relatively large amount of CPU power. As such, batch processing may be performed by computing device that is separate from the sensors or controllers of devices and utilizes the larger processing capabilities of the computing device. It is presently recognized that it may be advantageous to batch process data using processed sensor results rather than raw sensor data acquired by sensors and/or controllers. For example, utilizing the processed sensor results, as opposed to using raw sensor data, may reduce the amount of sensor data that is processed (e.g., batch processed) by a control system thereby enabling the control system to determine control actions more quickly, as well as freeing resources that may be used by the control system for other operations.

Accordingly, the present disclosure is directed to systems and methods for monitoring and controlling devices of an industrial automation system based on determined correlations and/or a result (e.g., an identified relationship) of root cause analysis between an unexpected operation of the industrial system and processed sensor results. In general, the processed sensor results (e.g., processed result) may include a result of processing raw sensor data (e.g., a classification of an anomaly or unexpected operation, maintenance condition, and/or operational state). In some embodiments, the result may include a portion (e.g., property layers of neural networks, or nodes and/or branches of decision trees) of a model used to produce the result as opposed to raw sensor data (e.g., unprocessed sensor data). Aspects in accordance with the present disclosure may include utilizing processed sensor results from multiple sources (e.g., sensors, smart devices, controllers) to determine correlations between the unexpected operation and a processed sensor result from a particular source. In general, the unexpected operation may be indicated by a discrepancy between an expected operation (e.g., a baseline operation) and measured data indicating an actual operation of one or more devices (e.g., the particular source). For example, aspects of the present disclosure may include determining a correlation between a particular processed sensor result and a signature that deviates from an expected operation (e.g., associated with a quality target or baseline operation). As used herein, a "quality target" is data associated with production of one or more products of an industrial automation system. For example, the quality target may indicates a condition of industrial automation devices, equipment, or machine components or a manufacturing quality of a product produced by the industrial automation system. As another non-limiting example, aspects of the present disclosure may include determining a correlation between a particular processed sensor result and deviation from a baseline operation of devices and/or equipment.

In general, the unexpected operation may include a deviation (e.g., a signature in data or a dataset indicating a deviation) from a baseline or expected operational state of industrial automation devices, equipment, or machine components of an industrial automation system. As used herein, a "signature" may include a value of data, a pattern of data, a set of changes of data, a trend of data, or a combination of data. For example, the expected operational state may be determining using a model utilizing a relationships between datasets, such as processed sensor results and a quality target or a baseline of measured data, as described in further detail herein. As such, a correlation between the unexpected operation (e.g., a signature that is a deviation from an expected operation) and the processed sensor result derived from measurement by a sensor (e.g., a sensor measuring an operational parameter of a device, an equipment, or machine component) may indicate that the unexpected operation is a direct or indirect result of a particular operation of the device, equipment, or machine component measured by the sensor. For example, the unexpected operation may indicate an abnormal condition of a product and the processed sensor result (i.e., correlated with the quality target) and/or may indicate an anomalous condition (e.g., a damaged bearing, a faulty pump, and the like) of a device, an equipment, or machine component. As such, a control system may utilize subsequently detected occurrences of the quality target (i.e., correlated to the anomalous condition) to trigger a remediation reaction to address the anomalous condition (e.g., halting operation of a machine, transmitting an alert, and the like) of the device or machine component. In this way, the discrepancy from an expected operation may be utilized as feedback for modifying operation of industrial automation equipment. It should be noted that discussion of the quality target may also apply to the baseline data.

Moreover, by utilizing processed sensor results as opposed to raw sensor data, the correlations may be determined during operation of the industrial operation system (i.e., in substantially real-time rather than offline). Further, it is presently recognized that such correlations and/or results of root cause analysis may provide an error measure for a model used to control an industrial system or components. That is, the determined correlations may be used to indicate whether a model is sufficient for controlling operation of the device and/or whether portions of the model should be retrained. In this way, the determined correlations and/or results of root-cause analysis between processed sensor data and quality targets may prevent and/or minimize retraining of a model used to control industrial automation components or devices, and thus improving the robustness of the model used to control the industrial process.

By way of introduction, FIG. 1 illustrates an example industrial automation system 10 employed by a food manufacturer. The present embodiments described herein may be implemented using the various devices illustrated in the industrial automation system 10 described below. However, it should be noted that although the example industrial automation system 10 of FIG. 1 is directed at a food manufacturer, the present embodiments described herein may be employed within any suitable industry, such as automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation device(s) 20.

Figure 2:
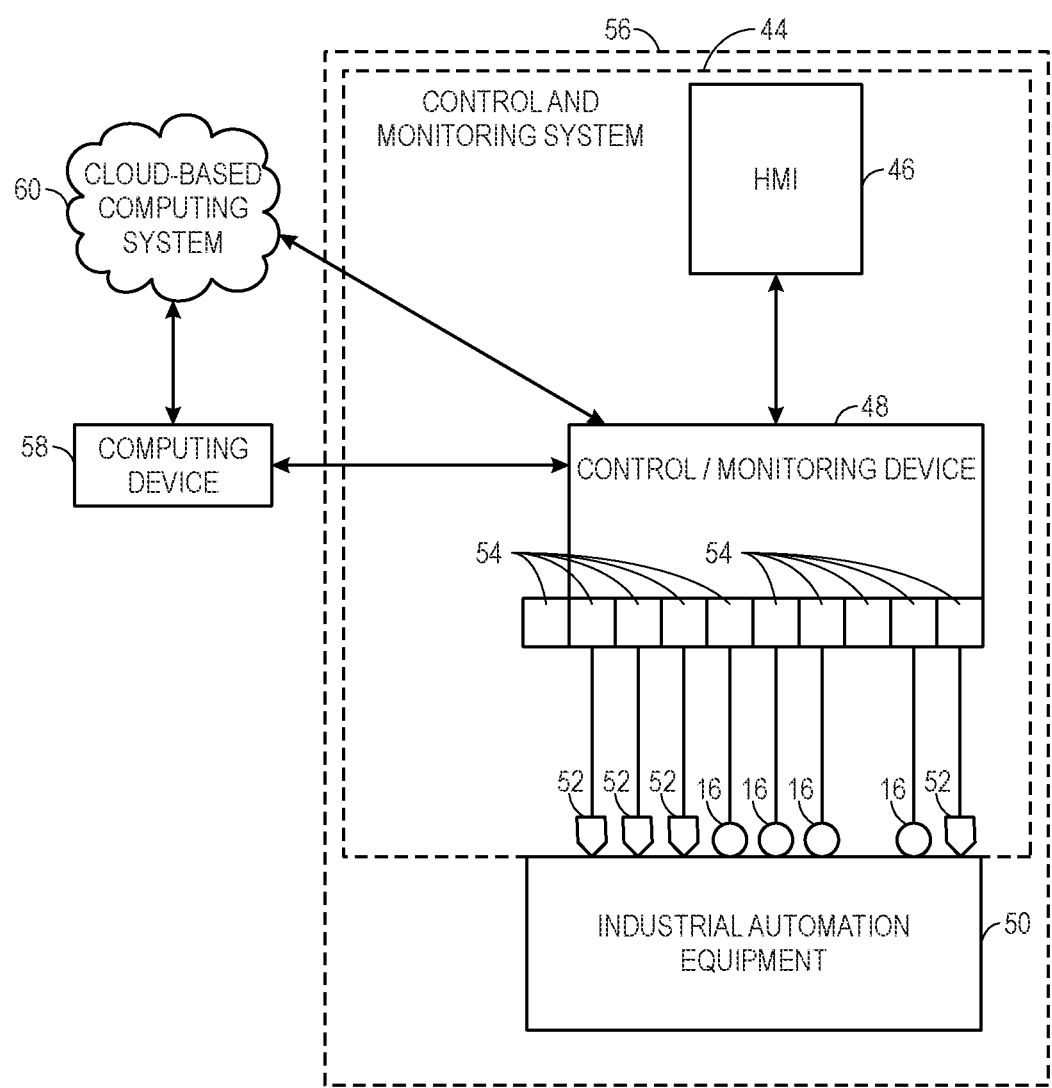
FIG. 2 illustrates a diagrammatical representation of an exemplary control and monitoring system that may be employed in any suitable industrial automation system, in accordance with an embodiment.

By way of example, FIG. 2 illustrates a diagrammatical representation of an exemplary local control system 42 that may be employed in any suitable industrial automation system 10, in accordance with embodiments presented herein. In FIG. 2, the local control system 42 is illustrated as including a human machine interface (HMI) 46 and a control/monitoring device 48 or automation controller adapted to interface with devices that may monitor and control various types of industrial automation equipment 50.

By way of example, the industrial automation equipment 50 may include the mixer 18, the depositor 22, the conveyor 24, the oven 26, other pieces of machinery described in FIG. 1, or any other suitable equipment.

It should be noted that the HMI 46 and the control/monitoring device 48, in accordance with embodiments of the present techniques, may be facilitated by the use of certain network strategies. Indeed, any suitable industry standard network or network may be employed, such as DeviceNet, to enable data transfer. Such networks permit the exchange of data in accordance with a predefined protocol and may provide power for operation of networked elements.

As discussed above, the industrial automation equipment 50 may take many forms and include devices for accomplishing many different and varied purposes. For example, the industrial automation equipment 50 may include machinery used to perform various operations in a compressor station, an oil refinery, a batch operation for making food items, a mechanized assembly line, and so forth. Accordingly, the industrial automation equipment 50 may comprise a variety of operational components, such as electric motors, valves, actuators, temperature elements, pressure sensors, or a myriad of machinery or devices used for manufacturing, processing, material handling, and other applications.

Additionally, the industrial automation equipment 50 may include various types of equipment that may be used to perform the various operations that may be part of an industrial application. For instance, the industrial automation equipment 50 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 50 may be made up of certain automation devices 20, which may include controllers, input/output (I/O) modules, motor control centers, motors, human machine interfaces (HMIs), operator interfaces, contactors, starters, sensors 16, actuators, drives, relays, protection devices, switchgear, compressors, firewall, network switches (e.g., Ethernet switches, modular-managed, fixed-managed, service-router, industrial, unmanaged, etc.), and the like.

In certain embodiments, one or more properties of the industrial automation equipment 50 may be monitored and controlled by certain equipment for regulating control variables used to operate the industrial automation equipment 50. For example, the sensors 16 and actuators 52 may monitor various properties of the industrial automation equipment and may provide data to the local control system 42, which may adjust operations of the industrial automation equipment 50, respectively.

In some cases, the industrial automation equipment 50 may be associated with devices used by other equipment. For instance, scanners, gauges, valves, flow meters, and the like may be disposed on industrial automation equipment 50. Here, the industrial automation equipment 50 may receive data from the associated devices and use the data to perform their respective operations more efficiently. For example, a controller (e.g., control/monitoring device 48) of a motor drive may receive data regarding a temperature of a connected motor and may adjust operations of the motor drive based on the data.

In certain embodiments, the industrial automation equipment 50 may include a communication component that enables the industrial equipment 50 to communicate data between each other and other devices. The communication component may include a network interface that may enable the industrial automation equipment 50 to communicate via various protocols such as Ethernet/IP®, ControlNet®, DeviceNet®, or any other industrial communication network protocol. Alternatively, the communication component may enable the industrial automation equipment 50 to communicate via various wired or wireless communication protocols, such as Wi-Fi, mobile telecommunications technology (e.g., 2G, 3G, 4G, 5G, LTE), Bluetooth®, near-field communications technology, and the like.

The sensors 16 may be any number of devices adapted to provide information regarding process conditions. The actuators 52 may include any number of devices adapted to perform a mechanical action in response to a signal from a controller (e.g., the control/monitoring device 48). The sensors 16 and actuators 52 may be utilized to operate the industrial automation equipment 50. Indeed, they may be utilized within process loops that are monitored and controlled by the control/monitoring device 48 and/or the HMI 46. Such a process loop may be activated based on process input data (e.g., input from a sensor 16) or direct operator input received through the HMI 46. As illustrated, the sensors 16 and actuators 52 are in communication with the control/monitoring device 48. Further, the sensors 16 and actuators 52 may be assigned a particular address in the control/monitoring device 48 and receive power from the control/monitoring device 48 or attached modules.

Input/output (I/O) modules 54 may be added or removed from the control and monitoring system 44 (e.g., control/monitoring system 44) via expansion slots, bays or other suitable mechanisms. In certain embodiments, the I/O modules 54 may be included to add functionality to the control/monitoring device 48, or to accommodate additional process features. For instance, the I/O modules 54 may communicate with new sensors 16 or actuators 52 added to monitor and control the industrial automation equipment 50. It should be noted that the I/O modules 54 may communicate directly to sensors 16 or actuators 52 through hardwired connections or may communicate through wired or wireless sensor networks, such as Hart or IOLink.

Generally, the I/O modules 54 serve as an electrical interface to the control/monitoring device 48 and may be located proximate or remote from the control/monitoring device 48, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE702.3, TCP/IP, UDP, Ethernet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 54 may transfer input and output signals between the control/monitoring device 48 and the industrial automation equipment 50. As illustrated, the sensors 16 and actuators 52 may communicate with the control/monitoring device 48 via one or more of the I/O modules 54 coupled to the control/monitoring device 48.

In certain embodiments, the control/monitoring system 44 (e.g., the HMI 46, the control/monitoring device 48, the sensors 16, the actuators 52, the I/O modules 54) and the industrial automation equipment 50 may make up an industrial automation application 56. The industrial automation application 56 may involve any type of industrial process or system used to manufacture, produce, process, or package various types of items. For example, the industrial applications 56 may include industries such as material handling, packaging industries, manufacturing, processing, batch processing, the example industrial automation system 10 of FIG. 1, and the like.

In certain embodiments, the control/monitoring device 48 may be communicatively coupled to a computing device 58 and a cloud-based computing system In this network, input and output signals generated from the control/monitoring device 48 may be communicated between the computing device 58 and the cloud-based computing system 60. Although the control/monitoring device 48 may be capable of communicating with the computing device 58 and the cloud-based computing system 60, as mentioned above, in certain embodiments, the control/monitoring device 48 (e.g., local computing system 42) may perform certain operations and analysis without sending data to the computing device 58 or the cloud-based computing system 60.

As discussed herein, it may be advantageous to utilize processed sensor results derived from (e.g., processed using) sensor data acquired by the sensors 16. For example, processing the sensor data (e.g., to generate the processed sensor results) may reduce the batch data that is processed by the control/monitoring device 48, and thus may enable the control/monitoring device 48 to more quickly determine control actions for controlling the industrial automation system 10. For example, the sensors 16 may be included within a smart device 62, which may include a processor that is capable of processing certain volumes of sensor data, such as streamed sensor data. In some embodiments, the smart device 62 may be capable of modifying the amount of data transmitted by the smart device 62 and/or the memory footprint of the processed sensor results based on instructions provided by the control/monitoring device 48, as discussed in more detail with respect to FIG. 6. In some embodiments, the smart device 62 may be capable of toggling or switching between different levels of processing based on the instructions from the control/monitoring device 48 and/or operational parameters determined based on the sensor data, where each level may include a relatively more complex processing algorithm. The relatively more complex processing algorithms may utilize more power, and thus, a smart device 16 capable of toggling between different levels of processing may have improved battery life. That is, the smart device 16 may toggle to a first level of processing (from a second level of processing that is relatively less complex than the first level of processing when a number of analysis operations exceeds a threshold, a threshold amount of processing power is expected to be used, or the like.

Figure 3:
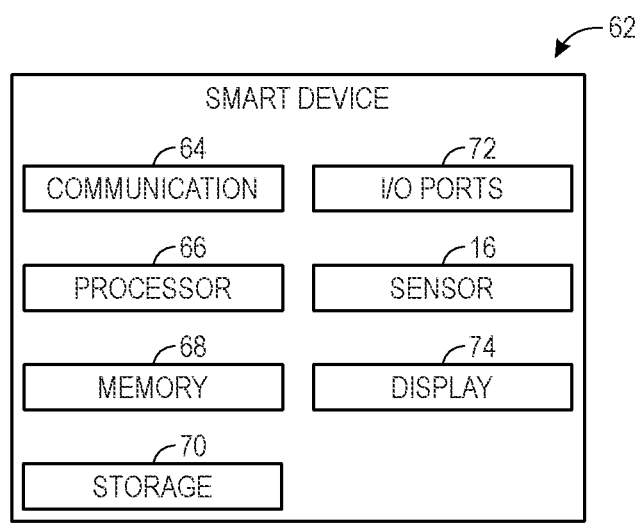
FIG. 3 illustrates example components that may be part of a smart device that may be implemented in the industrial automation system, in accordance with an embodiment.

For example, FIG. 3 illustrates example components that may be part of the smart device 62 or any other suitable computing device that implement embodiments presented herein. For example, the smart device 62 may include a communication component 64 (e.g., communication circuitry), a processor 66, a memory 68, a storage 70, input/output (I/O) ports 72, a sensor 16 (e.g., an electronic data sensor, a temperature sensor, a vibration sensor, a camera), a display 74, and the like. The communication component 64 may be a wireless or wired communication component that may facilitate communication between the smart device 62, additional smart device 62, the control/monitoring device 48, and other communication capable devices. In general, the control/monitoring device 48 may include generally similar components as the smart device 62. However, the control/monitoring device 48 may not include a sensor and the processor of the control/monitoring device 48 may be capable of processing relatively more data that the processor 66.

The processor 66 may be any type of computer processor or microprocessor capable of executing computer-executable code. The processor 66 may also include multiple processors that may perform the operations described below. The memory 68 and the storage 70 may be any suitable articles of manufacture that can serve as media to store processor-executable code, data, or the like. These articles of manufacture may represent computer-readable media (e.g., any suitable form of memory or storage) that may store the processor-executable code used by the processor 66 to perform the presently disclosed techniques. Generally, the processor 66 may execute software applications that include identifying anomalies in sensor data measured by the sensor 16, identifying a frequency corresponding to a change in the sensor data, determining a reduced set of sensor data, and generating constraints used to validate the sensor data, as discussed in more detail with respect to FIG. 6.

The memory 68 and the storage 70 may also be used to store the data, analysis of the data, the software applications, and the like. For example, the memory 68 and the storage 70 may store instructions associated with implementing different levels of processing for various operations. As another non-limiting example, the memory 68 and the storage 70 may store one or more previously acquired sensor data (e.g., by the sensor 16 of the smart device 62) or streamed sensor data from an additional smart device 62. As another non-limiting example, the memory 68 and the storage 70 may store a constraint that represents a relationship between sensor data acquired by the sensor 16 and streamed sensor data from one or more additional smart devices, as discussed in more detail with respect to FIG. 6. The memory 68 and the storage 70 may represent non-transitory computer-readable media (e.g., any suitable form of memory or storage) that may store the processor-executable code used by the processor 66 to perform various techniques described herein. It should be noted that non-transitory merely indicates that the media is tangible and not a signal.

The I/O ports 72 may be interfaces that may couple to other peripheral components such as input devices (e.g., keyboard, mouse), sensors, input/output (I/O) modules, and the like. The I/O modules may enable the smart device 62 to communicate with the computing device 58, the control/monitoring device 48, the industrial automation equipment 50, or other devices in the industrial automation system via the I/O modules.

The display 74 may depict visualizations associated with software or executable code being processed by the processor 66. In one embodiment, the display 74 may be a touch display capable of receiving inputs (e.g., parameter data for operating the industrial automation equipment 50) from a user of the smart device 62, such as an indication indicating that the smart device 62 should toggle to a different level of processing. As such, the display 74 may serve as a user interface to communicate with smart device 62. The display 74 may display a graphical user interface (GUI) for operating the smart device 62, for tracking the maintenance of the industrial automation equipment 50, and the like. The display 74 may be any suitable type of display, such as a liquid crystal display (LCD), plasma display, or an organic light emitting diode (OLED) display, for example. Additionally, in one embodiment, the display 74 may be provided in conjunction with a touch-sensitive mechanism (e.g., a touch screen) that may function as part of a control interface for the smart device 62 or for a number of pieces of industrial automation equipment in the industrial automation application 56, to control the general operations of the industrial automation application 56.

Although the components described above have been discussed with regard to the control/monitoring device 48 and the local control system 42, it should be noted that similar components may make up other computing devices described herein. Further, it should be noted that the listed components are provided as example components and the embodiments described herein are not to be limited to the components described with reference to FIG. 3. For example, the control/monitoring device 48 and the local control system 42 may include the communication component 64, the processor 66, the memory 68, the storage 70, the I/O ports 72, and the display 74. However, in general, the processor 66 of the control/monitoring device 48 may be capable of processing relatively more data than the processor 66 of the smart device 62. For example, the processor 66 of the control/monitoring device 48 may be capable of batch processing, while the processor 66 of the smart device 62 may be capable of processing streamed sensor data.

Keeping the foregoing in mind, in some embodiments, the memory 68 and/or storage 70 of the computing device 58 may include a software application that may be executed by the processor 66 and may be used to monitor, control, access, or view one of the industrial automation equipment 50. As such, the computing device 58 may communicatively couple to industrial automation equipment 50 or to a respective computing device of the industrial automation equipment 50 via a direct connection between the devices or via the cloud-based computing system 60. The software application may perform various functionalities, such as track statistics of the industrial automation equipment 50, store reasons for placing the industrial automation equipment 50 offline, determine reasons for placing the industrial automation equipment 50 offline, secure industrial automation equipment 50 that is offline, deny access to place an offline industrial automation equipment 50 back online until certain conditions are met, and so forth.

As another non-limiting example, and referring back to FIG. 2, in operation, the industrial automation application 56 may receive one or more process inputs to produce one or more process outputs. For example, the process inputs may include feedstock, electrical energy, fuel, parts, assemblies, sub-assemblies, operational parameters (e.g., sensor measurements), or any combination thereof. Additionally, the process outputs may include finished products, semi-finished products, assemblies, manufacturing products, by products, or any combination thereof.

To produce the processed outputs, the control/monitoring device 48 may output control signals to instruct industrial automation equipment 50 to perform a control action. For example, the control/monitoring device 48 may instruct a motor (e.g., an automation device 20) to implement a control action to cause the motor to operate at a particular operating speed (e.g., a manipulated variable set point).

In some embodiments, the control/monitoring device 48 may determine the manipulated variable set points based at least in part on process data. As described above, the process data may be indicative of operation of the industrial automation device 20, the industrial automation equipment 50, the industrial automation application 56, and the like. As such, the process data may include operational parameters of the industrial automation device 20 and/or operational parameters of the industrial automation application 56. For example, the operational parameters may include any suitable type of measurement or control setting related to operating respective equipment, such as temperature, flow rate, electrical power, and the like. In some embodiments, the process data may be acquired from the smart devices 62 and may include an aggregation of data acquired by multiple smart device 62.

Thus, the control/monitoring device 48 may receive process data from one or more of the industrial automation devices 20, the smart device 62, the sensors 16, or the like. In some embodiments, the smart device 62 may determine an operational parameter and communicate a measurement signal indicating the operational parameter to the control/monitoring device 48 when the operational parameter is above a threshold (e.g., indicating an anomaly or a maintenance condition), in accordance with a frequency of the operational parameter occurring (e.g., as discussed in more detail with respect to FIG. 6), and the like. For example, a temperature sensor may measure a temperature of a motor (e.g., an automation device 20) and transmit a measurement signal indicating the measured temperature to the control/monitoring device 48. The control/monitoring device 48 may then analyze process data associated with the operation of the motor to monitor performance of an associated industrial automation application 56 (e.g., determine an expected operational state) and/or perform diagnostics on the industrial automation application 56 based on the measured temperature.

To facilitate controlling operation and/or performing other functions, the control/monitoring device 48 may include one or more controllers, such as one or more model predictive control (MPC) controllers, one or more proportional-integral-derivative (PID) controllers, one or more neural network controllers, one or more fuzzy logic controllers, and other suitable controllers.

In some embodiments, the supervisory control system 40 may provide centralized control over operation of the industrial automation application 56. For example, the supervisory control system 40 may enable centralized communication with a user (e.g., operator). To facilitate, the supervisory control system 40 may include the display 74 to provide information to the user. For example, the display 74 may present visual representations of information, such as process data, selected features, expected operational parameters, and/or relationships there between. Additionally, the supervisory control system 40 may include similar components as the control/monitoring device 48 described above in FIG. 3.

On the other hand, the control/monitoring device 48 may provide localized control over a portion of the industrial automation application 56. For example, in the depicted embodiment of FIG. 1, the local control system 42 that may be part of the mixer 18 may include the control/monitoring device 48, which may provide control over operation of a first automation device 20 that controls the mixer 18, while a second local control system 42 may provide control over operation of a second automation device 20 that controls the operation of the depositor 22.

In some embodiments, the local control system 42 may control operation of a portion of the industrial automation application 56 based at least in part on the control strategy determined by the supervisory control system 40. Additionally, the supervisory control system 40 may determine the control strategy based at least in part on process data determined by the local control system 42. Thus, to implement the control strategy, the supervisory control system 40 and the local control systems 42 may be communicatively coupled via a network, which may be any suitable type, such as an Ethernet/IP network, a ControlNet network, a DeviceNet network, a Data Highway Plus network, a Remote I/O network, a Foundation Fieldbus network, a Serial, DH-485 network, a SynchLink network, or any combination thereof.

As discussed above, a correlation between one or more processed sensor results and a deviation from an expected operation (e.g., an identified unexpected operation, an identified anomalous condition, or a discrepancy between an operational state and an expected operation state) of the industrial automation system 10 may be used to control operation of the industrial automation system 10. In general, the correlation may be used to identify devices or machines that are operating in an expected or an unexpected manner. Thus, the correlation may enable an operator and or the control/monitoring device 48 to more efficiently identify devices, equipment, or machines for which maintenance or modifying operation (e.g., such as modifying or adjusting a model used to control the devices or machines) may be appropriate. The correlation may include a direct correlation, an indirect correlation, a linear correlation, or a non-linear correlation. As discussed herein, the processed sensor results may include a classification/label of measured or raw sensor data, an anomaly indicated by the measured or raw sensor data, a potential anomaly indicated by the measured or raw sensor data (e.g. when the sensor data deviates from an expected value or trend), and/or other process data that characterizes operation of an industrial automation device and/or equipment. For example, the processed sensor results may include processed data measured by the sensors 16, the smart device 62, and/or a local control system 42. As discussed herein, the quality target may include data indicating the performance of the industrial automation system and/or a condition of an industrial automation device or product produced by the industrial automation system.

Figure 4:
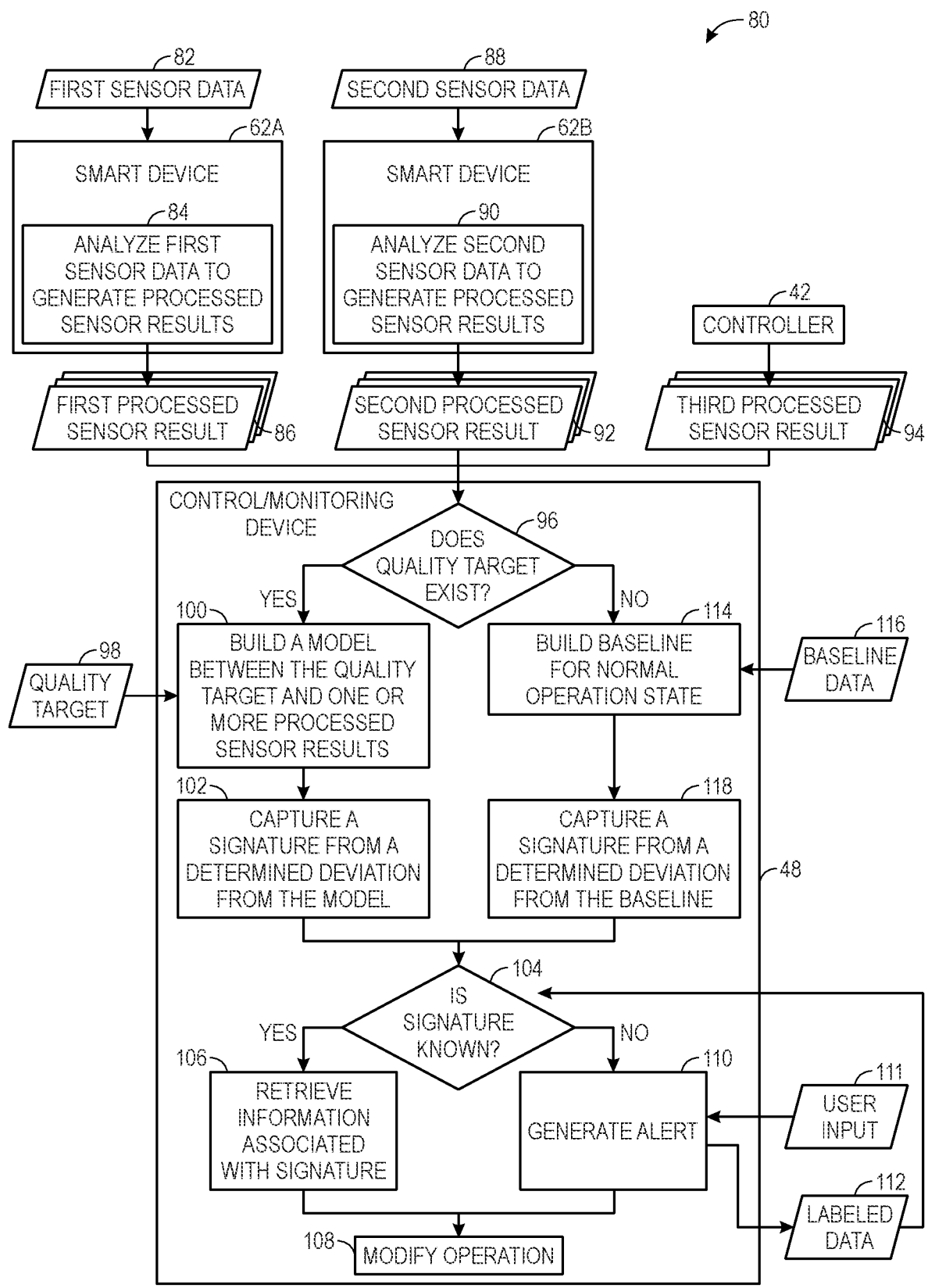
FIG. 4 is a data flow diagram representative of a process performed by the control system of FIG. 3 to determine a correlation between an unexpected operation and processed sensor results that may be used to control operation of the industrial automation system, in accordance with an embodiment.

To illustrate this, FIG. 4 illustrates a flowchart of a method 80 for controlling operation of the industrial automation system 10 (e.g., a machine, a component of a machine, an industrial automation equipment or device, and the like) using a correlation between a processed sensor results acquired by a sensor and a discrepancy from an expected operation. Although the method 80 is described as being performed by the control/monitoring device 48, it should be noted that any suitable computer device capable of communicating with other components in the industrial automation system 10 may perform the disclosed method 80 including, but not limited to, the cloud-based computing system 60, the computing device 58, and the like.

With this in mind, and referring now to FIG. 4, a first smart device 62a may measure, obtain, or acquire a first sensor data 82. In general, the first sensor data 82 may include raw sensor data (e.g., sensor data that has not undergone pre-processing) such as vibrational data, temperature data, pressure data, and the like. For example, the first sensor data 82 may be indicative of operational parameters (e.g., a temperature, an operating speed, a mass, a volume, a type of material being processed, a pressure, a humidity level, a voltage, and the like) and/or actions or operations being executed by the industrial automation equipment 50, such as the mixer 18, the depositor 22, the conveyor 24, the oven 26, and the like over a period of time in which the industrial automation system 10 operates. For example, the first sensor data 82 may include vibrational data, electrical data, and/or acoustic data. At least in some instances, the first sensor data 82 may originate from a sensor 16 external to the first smart device 62a. For example, a sensor 16 may acquire raw sensor data and transmit the raw sensor data to the first smart device 62 for further processing at block 84. At least in some instances, a controller (e.g., a local controller 42) may transmit the processed sensor result 86.

At block 84, the first smart device 62a may analyze the first sensor data 82 to generate a first processed sensor result 86 (e.g., a data set corresponding to a processed result of the sensor data 82). In general, to analyze the first sensor data 82, the first smart device 62 may identify features and classify one or more portions of the first sensor data 82 based on the features. In some embodiments, raw sensor data may be classified to a particular portion or part of a machine or industrial automation system, resulting in the first processed sensor result 86. That is, the first processed sensor result 86 has been "contextualized" (e.g., using contextual information), which may enable the contextualized first processed sensor result 86 to identify correlations and determine meaningful operation changes to achieve quality goal (e.g., a quality target). At least in some instances, the first smart device 62a may preprocess the first sensor data 82 (e.g., filtering, denoising, and the like) to generate the first processed sensor result 86. As such, the first process sensor result 86 has a smaller memory footprint as compared to the first sensor data 82. In a generally similar manner as described with respect to the first smart device 62a, the second smart device 62b may measure or acquire a second sensor data 88. At block 90, the second smart device 62b may identify features within the second sensor data 88 and classify the second sensor data 88 based on the features to generate a second processed sensor result 92.

To generate the first processed sensor result 86, the second processed sensor results 92, or both, the first smart device 62a and/or the second smart device 62b may provide the first sensor data 82 as input to a model, such as a decision tree and/or a neural network. In general, the model may be a model implemented by an industrial automation component, equipment, or device to control operation of the component, equipment or device. Further, the sensor data (e.g., the first sensor data 82 and/or second sensor data 88) may be associated with the industrial automation component, equipment, or device. That is, a sensor 16 may acquire the raw sensor data (e.g., the first sensor data 82) that indicates an operational parameter of the industrial automation component, equipment, or device that is implementing the model.

In an example where the model is a neural network, the neural network may utilize one or more property layers to identify features of the sensor data classify a condition (e.g., an anomaly condition and/or a maintenance condition) based on the features. As such, the first smart device 62 may provide the first sensor data 82 to the neural network and receive a classification of the first sensor data 82, such as whether or not the first sensor data 82 indicates a condition (e.g., an anomaly, a maintenance condition, and the like) of the machine or component of the machine. Accordingly, the processed sensor result 86 may include data indicating the condition (e.g., string or numerical representative of an anomaly) or one or more property layers associated with an identified feature of the first sensor data 82 that result in the classification.

As another non-limiting example, the model implemented by the industrial automation component, equipment, or device may be a decision tree. The decision tree may include multiple nodes (e.g., decision nodes) representing a decision to be made based on the process data and branches that connect nodes to additional nodes, and ultimately to the output decision, target, or goal, such as a classification. In general, the output for a decision tree is based on a type of operation for which the decision tree is trained. For example, a decision tree trained for monitoring operations may provide an output that classifies a condition, whether binary (e.g., a numerical indication indicating whether or not a device is healthy or unhealthy) or any set of conditions of the industrial automation process.

In yet another non-limiting example, a decision tree trained for predictive maintenance operations may provide an output that indicates a future fault, such as an estimated time period corresponding when a device of an industrial system needs repairing. As a further example, a decision may be trained to provide an output that indicates whether a model implemented by a control system is suitable for controlling the industrial system (e.g., via control actions implemented via the control system), whether to modify the model, or whether to select a different model to control the industrial system. In any case, the first smart device 62a may provide the first sensor data 82 as input to the decision tree and receive a classification of the first sensor data 82, such as whether or not the first sensor data 82 indicates a condition (e.g., an anomaly, a maintenance condition, and the like) of the machine or component of the machine. In turn, the classification or the branch of the model that connects the input to the output may be the sensor result. Accordingly, the processed sensor result 86 may include data indicating the condition (e.g., string or numerical representative of an anomaly), branches, and/or nodes that are connected to the output of the decision tree, and thus, resulted in the classification of the first sensor data 82.

Additionally, a controller 42 may generate a third processed sensor result. As described herein, the third processed result 94 may include a classification/label of measured or raw sensor data, an anomaly indicated by the measured or raw sensor data, a potential anomaly indicated by the measured or raw sensor data (e.g. when the sensor data deviates from an expected value or trend), and/or other process data that characterizes operation of an industrial automation device and/or equipment.

Returning back to FIG. 4, as shown in the illustrated embodiment, control/monitoring device 48 receives the first processed sensor result 86, the second processed sensor result 92, the third processed sensor result 94. In general, the control/monitoring device 48 determines whether a correlation exists between a deviation from an expected operation and one or more of the processor sensor results (e.g., the first processed sensor result 86, the second processed sensor result 92, the third processed sensor result 94, or any combination thereof).

At block 96, the control/monitoring device 48 may determine whether a quality target 98 is available. As discussed herein, the quality target may be a label, classification, or data indicating a performance target and/or an operational state of the industrial automation system 10 (e.g., or a portion of the industrial automation system such as a machine). For example, the quality target 98 may be an image obtained by a camera of a product (e.g., a completed product, a partially completed product) produced by the industrial automation system, a description of the product, a duration at which the industrial automation system 10 was operating, an amount of product produced, or other performance metrics indicating the quality or performance of the industrial automation system. In some embodiments, the quality target corresponds to a condition such as a defect of one or more products of produced by the industrial automation system 10. Accordingly, the control/monitoring device 48 may determine whether data indicating a performance target and/or an operational state of the industrial automation system 10 exists. If the control/monitoring determines that the quality exists, the control/monitoring device 48 may proceed to block 100.

At block 100, the control/monitoring device 48 builds a model between the quality target and one or more of the processor sensor results (e.g., the first processed sensor result 86, the second processed sensor result 92, and/or the third processed sensor result 94). In some embodiments, building a model may include determining whether a correlation exists between the quality target 98 and the first processed sensor result 86 and/or the second processed sensor result 92. In such embodiments, the model may receive a processed sensor result as input and generate an output quality target. As discussed herein, the correlation may indicate whether a first set of changes between a first dataset (e.g., the first processor sensor result 86, second processed sensor result 92, and/or the third processed sensor result 94) correspond to a second set of changes in the quality target 98. In general, to determine whether the correlation exists, the control/monitoring device 48 may monitor multiple processed sensor results from different sources, such as the first processed sensor result 86, the second processed sensor result 92, and/or the third processed sensor result 94. For example, the first processed sensor result 86 may be a first classification of an operational state of a first device (e.g., the first device is operating in a state A, B, C, or D). Additionally, the second processed sensor result 92 may be a second classification of an operational state of a second device (e.g., the second device is operating in a state E, F, G, or H). As such, if the control/monitoring device 48 determines that a change in the operational state of the first device results in or corresponds to a change in a quality target 98, the control/monitoring device 48 may output an indication that the correlation exists. For example, the correlation may be a probability or likelihood that a change in the operational state of the first device results will produce a change in the quality target 98. As such, the control/monitoring device 48 may indicate that the quality target 98 and a processed sensor result (e.g., the first processed sensor result 86 and the second process sensor result 92) are correlated if the probability is above a threshold (e.g., greater than 50%, greater than 60%, greater than 70%, greater than 95%). Similarly, if the control/monitoring device 48 determines that a change in operational state of the second device does not result in a change in the quality target 98 (e.g., the probability is below a threshold), the control/monitoring device 48 may determine that a correlation does not exist.

At block 102, the control/monitoring device 48 captures a signature of a determined deviation from the model. In general, to capture the signature of the deviation, the control/monitoring device 48 may determine whether the model (e.g., built or determined at block 100) is still valid e.g., within a threshold range of error) for one or more processed sensor results (e.g., the first processed sensor results 86, the second processed sensor results 92, and the third processed sensor results 94). For example, the control/monitoring device 48 may determine whether a trend, profile, or pattern (e.g., set of changes) of a combination of the quality target and one or more of the processed sensor results deviates from a trend, profile of the model. If the model is still valid, the control/monitoring device 48 continues to monitor for a signature. However, if the control/monitoring device 48 determines a deviation from the model, the control/monitoring device captures or identifies a signature (e.g., the processor sensor result(s) and/or the quality target) and proceeds to block 104. As described herein, the signature may include a value of data, a pattern of data, a set of changes of data, a trend of data, or a combination of data (e.g., a combination of quality target(s) and one or more processed sensor results). Accordingly, a signature of a deviation from an expected operation (e.g., modeled or baseline) may include a value of data, a pattern of data, a set of changes of data, a trend of data, or a combination of data, that deviates from an expected value of data, an expected pattern of data, an expected set of changes of data, an expected trend of data, or an expected combination of data.

At block 104, the control/monitoring device 48 determines whether the signature is known (e.g., having data stored in a storage component that indicates the signature was previously identified and/or is linked to a corrective action). That is, the control/monitoring device 48 determines whether an accessible storage component (e.g., cloud or locally accessible) stores a labeled signature. If the control/monitoring device 48 determines that the signature is known, the control/monitoring device, at block 106, retrieves or fetches the information associated with the signature. For example, the control/monitoring device 48 may fetch the information associated with a known label, generate an alarm corresponding to the label, and determine any corrective action already associated with this label. In any case, the control/monitoring device 48 may proceed to block 108 from block 106, as described in more detail below.

However, if at block 104, the control/monitoring device 48 determines that the signature (e.g., identified or determined at block 102) is unknown, the control/monitoring system 48 may proceed to block 110 and generate an alert or alarm. In general, the alert or alarm may indicate the signature to the control/monitoring device 48. In some embodiments, the alert may be displayed on a device (e.g., a mobile device, a laptop, a personal computer, or otherwise) associated with a user, such as a manager of the industrial automation system. In some embodiments, the alert may notify a user of a potential anomaly, and request that the user provide feedback to indicate whether the sensor data corresponds to an anomaly. In some embodiments, the notification may include contextual information indicating a particular machine or location associated with the equipment, machine, or device that it represented by the original sensor data (e.g., the raw sensor data that was subsequently processed to generate the processed sensor results). In this way, the user may more readily determine and provide (e.g., via user input 111) an appropriate response, such as performing maintenance or modifying operation of the equipment, machine, or device. In some embodiments, outputting the alert may include generating a label 112 for the processed sensor result that is correlated with the quality target 98. For example, the alert may include the control/monitoring device 48 may provide a notification that requests for a label that generally classifies the discrepancy or deviation and/or include a corrective action to be implemented upon future occurrences of the signature. As such, the control/monitoring device 48 may label the signature indicating a relationship (e.g., a correlation, a root-cause relationship, and the like) between the condition (e.g., a new operating condition), operational state (e.g., a new operational state), or otherwise corresponding to the processed sensor result and the quality target 98 for a subsequent occurrence of the condition, operational state, or otherwise.

At block 108, the control/monitoring device 48 modifies operation based on information associated with the labeled signature (e.g., the information retrieved at block 104 and/or a new label provided to the signature). In general, modifying the operation may include taking a corrective action associated with the label between the quality target 98 and the processed sensor results (e.g., the first processed sensor results 86 and/or the second processed sensor results 92).

As another non-limiting example, the control/monitoring device 48 may take the corrective action by sending a command to a controller of an industrial automation component causing the industrial automation component to modify operation (e.g., stopping operation), at block 108. That is, the corrective action may include sending a command to a device associated with the smart device 62*a* and/or 62*b* that obtained the data correlated with the quality target 98. For example, the command may include instructions that cause the industrial automation component to halt operation, revert to a previous operational state, or adjust (e.g., increase or decrease) a speed of operation. At least in some instances, the control/monitoring device 48 may receive contextual information as input (e.g., provided by a user or determined based on smart tags as described in more detail with respect to FIG. 6) and use the contextual information to take the corrective action. For example, if the contextual information indicates that a bearing of machine is damaged, the control/monitoring device 48 may identify the machine that includes the bearing and modify operation of the entire machine and/or machines upstream or downstream of the machine with respect to the industrial process. In some embodiments, the control/monitoring device 48 may send the command to an industrial automation device that is distinct from the smart device 62*a* and/or 62*b* (e.g., the industrial automation components that are monitored by the smart device 62*a* and/or 62*b*). For example, the control/monitoring device 48 may utilize contextual information to determine the device when the contextual information indicates that the data correlated with the quality target 98 is associated with the device.

However, if the control/monitoring device 48 determines that a quality target 98 (e.g., or a model relating the quality target 98 to the one or more processed data results) does not exist, the control/monitoring device 48 may proceed to block 114. At block 114, the control/monitoring device 48 may build or generate a baseline indicating an expected operational state of one or more components of the industrial automation system 10 based on a baseline data 116 indicating a deviation from an expected operational state (e.g., an unexpected operational state). In general, and as discussed in more detail with respect to FIG. 5, the control/monitoring device 48 may receive data indicating a baseline operation of one or more industrial automation components. At least in some instances, such as if data indicating the baseline operation is unavailable, the control/monitoring device 48 may determine a baseline operation from one or additional sources. In an embodiment where multiple sources are used to determine the baseline operation, it should be noted that the determined baseline operation may include a reduced set of data acquired from the multiple sources.

At block 118, the control/monitoring device 48 captures a signature from a determined deviation from the baseline data 116. In general, the control/monitoring device 48 may perform block 114 in a generally similar manner as described with respect to block 102, however using the baseline data 116 instead of the model. Accordingly, the control/monitoring device 48 may proceed to block 104, utilizing the correlation captured signature indicating a correlation between a deviation from the baseline operational state. The process 80 may then proceed to blocks 106, 108, and/or 110 in a generally similar manner as described above.

As one non-limiting example of an implementation of the method 80, the processed sensor results may include vibrational data indicating a condition of bearings (e.g., an outer race of a bearing, an inner race of a bearing, a fault in the ball of the bearing, a healthy bearing). The quality target may include misalignment data (e.g., various degrees of misalignment) of a machine including the machine component (e.g., the bearing). Accordingly, at block 96, the control/monitoring device 48 may determine whether a correlation exists between a particular degree of misalignment and the condition of the bearing. For example, the control/monitoring device 48 may attempt to cluster the data (e.g., the processed sensor results and the quality target). As such, if a particular degree of misalignment is clustered with a particular condition of the bearing, the control/monitoring device 48, the control/monitoring device 48 may determine that the degree of a misalignment is correlated with condition of the bearing. Accordingly, when the control/monitoring device 48 detects subsequent occurrences of the degree of misalignment, the control/monitoring device may output an alert indicating the condition of the bearing and/or adjust operation of the machine including the bearings.

Accordingly, performing the method 80 may provide a relationship (e.g., a correlation and/or a root cause relationship) between a quality target and a processed sensor result that indicates whether an occurrence of a quality target may be a result of a condition indicated by the processed sensor result. The quality target may indicate an anomalous condition, a maintenance condition, and the like of a device, equipment, or machine monitored by a sensor that was used to generated the processed result. Accordingly, subsequent occurrence of a measurement that is generally similar to the quality target may inform decision related to controlling the operation or maintaining device, equipment, or machine of an industrial system. In this way, the method 80 provides techniques for improving the efficiency of detecting components of an industrial system that are operating in an expected or unexpected manner.

As discussed herein, the control/monitoring device 48 may determine baseline data indicating a baseline operation or an expected operation of one or more devices and/or equipment of the industrial automation system 10. The baseline data may be used to identifying the occurrences of unexpected operations, such as anomalies, and potentially processed sensor results correlated with the anomaly.

Figure 5:
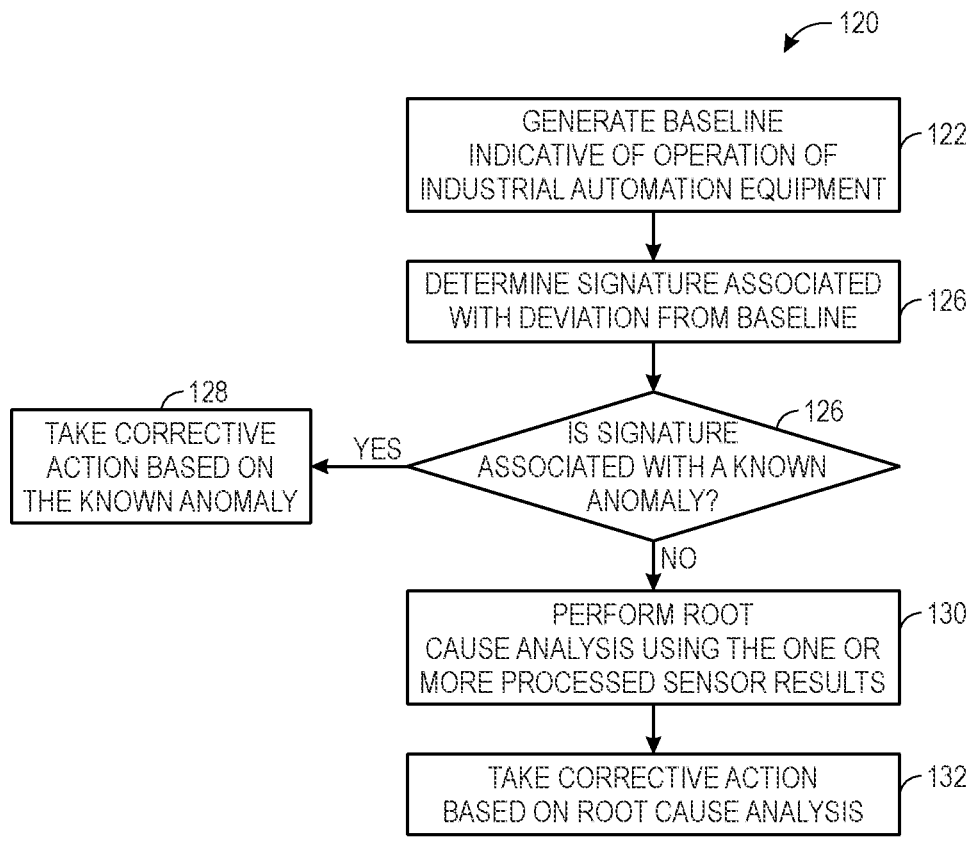
FIG. 5 illustrates a flow chart of a method determining a baseline indicating an expected operational state that may be used to control operation of the industrial automation system, in accordance with an embodiment.

To illustrate this, FIG. 5 illustrates a flow diagram of a method 120 for determining baseline data. Although the method 120 is described as being performed by the control/monitoring device 48, it should be noted that any suitable computer device capable of communicating with other components in the industrial automation system 10 may perform the disclosed method 120 including, but not limited to, the smart device 62, the computing device 58, the cloud-based computing device 60, and the like.

At block 122, the control/monitoring device 48 generates baseline data indicative of operation of industrial automation equipment. For example, to determine the baseline, the control/monitoring device 48 may determine a root mean square (RMS) of streamed sensor data, determine a mean of sensor data, determine a standard deviation of sensor data, cluster streamed sensor data, and/or performing multi-dimensional binning. For example, the control/monitoring device 48 may determine a mean of sensor data as the sensor data is acquired by the sensor 16, the smart device 62, and/or a controller for a time period or amount of data. Once the baseline is determined, the control/monitoring device 48 may store the mean in the memory of the control/monitoring device 48 to compare with subsequently received sensor data.

At block 124, the control/monitoring device 48 determines a signature of a deviation from an expected operation state (e.g., a discrepancy between a current operation of one or more components of the industrial automation system 10 and the expected operation) based on the baseline data. In general, the smart device 62 may receive sensor data indicating an expected operation and/or a current operation in a similar manner as described above with respect to block 84 and identify the anomaly in the received sensor data (e.g., subsequently received sensor data).

At block 126, the control/monitoring device 48 determines whether the signature is associated with a known anomaly. In general, the control/monitoring device 48 may perform a similar operation as described with respect to block 104. For example, the control/monitoring device 48 may determine whether the signature is correlated with and/or a root cause for a known anomaly. For example, if the signature deviates from the expected operational state exceeds a threshold (e.g., an error threshold), the control/monitoring device 48 may compare the signature to one or more stored operational parameters associated with known conditions (e.g., a minimum achievable pressure due to a seal of the vacuum being damaged, a conveyor belt speed associated with a pulley being broken). As such, if the signature matches a stored operational parameter matches (e.g. is within a threshold range), control/monitoring device 48 may determine that the detected anomaly (e.g. associated with the operational parameter) corresponds to a known condition. Accordingly, the control/monitoring device 48 may take a corrective action (e.g., at block 128) associated with the known condition, such as by outputting an alert indicating the known condition to the control/monitoring device 48.

If the control/monitoring device 48 determines that the signature is not associated with a known anomaly or condition, the method proceeds to block 130. At block 130, the control/monitoring device 48 performs a root-cause analysis of the signature using the one or more processed sensor results and a model and/or baseline data 116. In general, to perform root-cause analysis, the control/monitoring device 48 may analyze a cluster of data and determine at least two data having a correlation or causal relationship. For example, the control/monitoring device 48 may receive a combination of multiple processed sensor results and a quality target that deviates from a model. That is, the model may be capable of predicting a quality target given a combination of operational states, labels, or otherwise as described herein indicated by the processed sensor results. Accordingly, the control/monitoring device 48 may identify at least one of the data (e.g., one or the multiple processed sensor results) that affects the quality target associated with the signature that deviates from the modeled operation. For example, the control/monitoring device 48 may identify whether the quality target is affected when one of the multiple processed sensor results is held constant, which may isolate a particular processed sensor result. In any case, the root cause analysis may identify a machine, equipment, or component associated with the processed sensor result(s) that resulted in the signature that deviates from the modeled operation.

At block 132, the control/monitoring device 48 takes a corrective action based on a result of the root cause analysis (e.g., a relationship identified by the root cause analysis). In some embodiments, to take the correction action, the control/monitoring device 48 may determine whether a known corrective action is stored in a storage component or knowledge base that indicates the corrective action to take or includes a recommendation of the corrective action. In some embodiments, to take the correction action, the control/monitoring device 48 may cause a display to output a notification to a user indicating the results of the root cause analysis. For example, the notification may indicate the one or more industrial automation components associated with the processed sensor results used in the root cause analysis. In some embodiments, to take the correction action, the control/monitoring device 48 may utilize a machine learning (ML) module or component. For example, the control/monitoring device 48 may employ reinforcement learning to recommend safe actions, see the impact of the recommended actions and tune the response over time. At least in some instances, the control/monitoring device 48 may utilize a digital twin to determine a corrective action. For example, the control/monitoring device 48 may retrieve a digital twin and provide one or more inputs indicating potential control actions and receive outputs indicating the response of one or more industrial automation components represented by the digital twin. As such, the control/monitoring device 48 may determine the one or more inputs that cause the digital to revert to the baseline operation, and thus, the corrective action may include the control actions associated with the determined one or more inputs.

As discussed herein, a labeled signature may indicate a relationship between a quality target 98 and operation of certain industrial automation components, machines, or equipment. As such, the quality target may be utilized as a metric for monitoring the performance of a model implemented by a device. That is, monitoring an unexpected operation and/or a quality target may provide feedback (e.g., closed loop feedback) for a model used to control an industrial process. Further, utilizing the quality target and/or baseline data associated with a labeled signature may prevent and/or minimize retraining of the entire model, and thus improving the robustness of the model used to control the industrial process.

Figure 6:
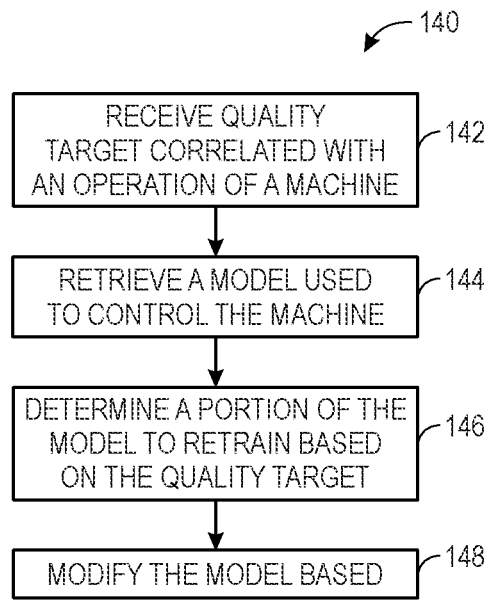
FIG. 6 illustrates a flow chart of a method for modifying a model used to control operation of the industrial automation system based on an identified unexpected operation, in accordance with an embodiment.

To illustrate this, FIG. 6 illustrates a flow diagram of a method 140 for utilizing the labeled signature (e.g., labeled data 112) in a closed loop or semi-closed loop as feedback for determining whether to modify or retrain a model. Although the method 140 is described as being performed by the control/monitoring device 48, it should be noted that any suitable computer device capable of communicating with other components in the industrial automation system 10 may perform the disclosed method 140 including, but not limited to, the smart device 62, the computing device 58, the cloud-based computing device and the like. Although described in the context of a quality measure or target associated with a labeled signature, it should be understood that the techniques described with respect to the method 140 may also apply to baseline data 116. For example, a labeled signature may indicate that the occurrence of a particular signature is associated with an unexpected operation of a particle equipment, as generally described herein.

At block 142, the control/monitoring device 48 may receive a quality measure (e.g., a quality target) that is correlated with an operation of a device, an equipment, or a machine. As discussed herein, the quality target may be a classification of a product or an operation of the industrial process. For example, the quality target may include a measured degree of misalignment, labeled image data indicating defects in a product, a throughput of a machine, and the like. At least in some instances, the quality target may be obtained from a different portion of the industrial system as compared to the device, the equipment, or the machine, such as a different machine and/or during a different time period of the production of a product by the industrial system.

At block 144, the control/monitoring device 48 may retrieve a model used to control the device, the equipment, or the machine. In general, the control/monitoring device 48 may retrieve the model from a storage component, such as from an edge device, a cloud storage, a memory of a smart device, a memory of the control/monitoring device 48, and/or a memory of the local control system 42. For example, to retrieve the model, the control/monitoring device 48 may identify sensor data that is correlated with the quality target, and in turn, identify an industrial automation component, device, or equipment associated with the sensor data. In general, the model may be a previously trained model that is trained using techniques such as artificial intelligence (AI) and/or machine learning (ML) modules, using training data. For example, the model may be trained on multiple sets of data (e.g., including inputs and outputs). As such, certain portions (e.g., neural property layers or branches) may be associated with certain subsets of the data. Accordingly, it may be advantageous to identify the subsets of data to retrain using a quality target, as described herein, thereby improving the robustness of the model as compared to retraining the entire model.

At block 146, the control/monitoring device 48 may determine a portion of the model to retrain based on the quality target and/or deviation from the baseline data 116 received at block 142. As discussed herein, the quality target may be correlated with a machine or model via a processed sensor result. Further, the processed sensor result may include a portion of the model, such as a branch and/or nodes of a decision tree that output a decision based on the sensor data received by the smart device 62, for example. Accordingly, the control/monitoring device 48 may determine to retrain the branches of the decision tree that are correlated with the quality target if the quality indicates an unexpected operation of the control/monitoring device 48. In some embodiments, retraining the portion of the model may include outputting a notification to a user or operator via a computing device to provide input (e.g., supervising) and/or additional data sets to further refine the portion to retrain.

At block 148, the control/monitoring device 48 may modify the model used to control operation of the industrial automation component based on the error. That is, the control/monitoring device 48 may retrain the portions of the model determined at block 146 when the error (e.g., indicated by the quality target) of the model exceeds a threshold. For example, the control/monitoring device 48 may retrain property layers of a neural network if the processed sensor result correlated with the quality target received at block 144 includes the property layers.

Accordingly, the method 140 provides techniques for incrementally modifying a model based on a root-cause analysis of a quality target and processed sensor results, which may include a particular model used to control a device and/or portions of the model that produced an output of the model. In general, a portion of the model associated with the quality target (e.g., indicating an anomaly) is modified or retrained, rather than retraining the entire model. In this way, retraining of the model may utilize less resources, and thus the model may be efficiently implemented and modified into an industrial automation system.

Figure 7:
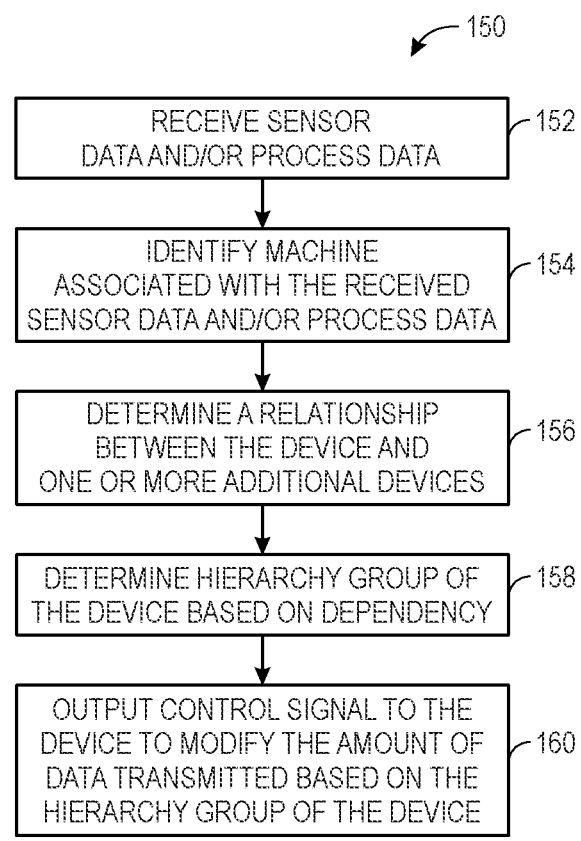
FIG. 7 illustrates a flow chart of a method for generating a reduced set of sensor data, in accordance with an embodiment.

As described herein, the processed sensor result is generally a subset or data having a smaller memory footprint than the measure sensor data. At least in some instances, the amount of data transmitted as the processed sensor result may be controlled by a suitable controller, such as the local controller 42 or the control/monitor device 48. To illustrate this, FIG. 7 illustrates a flow diagram of a method 150 for adjusting the amount of data transmitted by sensors 16, smart device 62, controllers, and other devices that may obtain or process sensor data. Although the method 150 is described as being performed by the control/monitoring device 48, it should be noted that any suitable computer device capable of communicating with other components in the industrial automation system 10 may perform the disclosed method 150 including, but not limited to, the smart device 62, the computing device 58, the cloud-based computing device 60, and the like.

With this in mind, and referring now to FIG. 7, at block 152, the control/monitoring device 48 may receive sensor data and/or process data acquired or measured by one or more devices of the industrial automation system. For example, the control/monitoring device 48 may receive a processed sensor result 86, 92 from a smart device 62 that measures operational parameters of a particular device, equipment, or machine, as generally described with respect to block 84 of FIG. 4. At block 154, the control/monitoring device 48 may identify the device, equipment, or machine associated with the received sensor data and/or process data. For example, each sensor may be equipped with a "smart tag" data structure where application contextual information is captured. For example, the contextual information may be GPS coordinates that can be transmitted with sensor reading allowing the recipient to construct a digital twin of the sensory network automatically. In some embodiments, the contextual information may be generated based on input. For example, the sensor data received at block 152 may be generated based on operational parameters of a component (e.g., a pump, a bearing, an actuator) of a machine. As such, a user may provide an input indicating the machine, and thus associating the component to the machine.

At block 156, the control/monitoring device 48 may determine a relationship between the device and one or more additional devices. In general, the relationship may indicate contextual information associated with the one or additional devices in the context of the industrial automation system 10. For example, the control/monitoring device 48 may identify a group of smart devices that are measuring data of a similar industrial automation component. As another non-limiting example, the sensor data and/or process data may include a smart tag that may indicate a location associated with multiple smart devices 62 and/or sensors 16 may be approximately the same, and thus the smart devices 62 and/or sensors 16 are grouped. As another non-limiting example, the control/monitoring device 48 may identify a controller that is communicatively coupled to the smart devices 62 and/or sensors 16 or in a similar location as the devices. As such, the control/monitoring device 48 may determine that the controller is used to control operation of a machine that is monitored by the sensors. Accordingly, the control/monitoring device 48 may determine a relationship between the sensors and the controller indicating that the controller determines control actions based on the sensor data acquired by the sensors.

At block 158, the control/monitoring device 48 may determine a hierarchy group of the device. In general, the hierarchy group indicates a relative hierarchy between the device and one or more devices, machine, or equipment of the industrial automation system. As used herein, "hierarchy" may refer to a relative ordering based on the processing of data and the transmission of data. For example, a device associated with a lower hierarchy group (e.g., a first hierarchy group) may include a sensor and/or smart sensors that measure sensor data associated with a machine, and a device associated with a relatively higher hierarchy group (e.g., a second hierarchy group) may include a controller that receives the sensor data, filters the sensor data, and/or determines control actions based on the sensor data. Further, a device associated with a relatively higher hierarchy group (e.g., a third hierarchy group) may include a control system that receives the filtered data from the controllers or sensors of the second hierarchy group. As such, the control/monitoring device may assign a first hierarchy group to sensors that measure sensor data of a machine, a second hierarchy group to the controller that controls the machine based on the sensor data, and a third hierarchy group that controls multiple machines (e.g., including the machine of the second hierarchy group).

At block 160, the control/monitoring device 48 may output a control signal to the device to modify the amount of data transmitted based on the hierarchy group. For example, the control/monitoring device 48 may send a control signal that causes a sensor to transmit data to a controller that processes sensor data and sends the processed sensor data to the control/monitoring device 48. That is, the control signal may generally modify which devices perform certain levels of processing raw sensor data or pre-processed sensor data. Additionally or alternatively, the control/monitoring device 48 may send a control signal that causes the subset of sensors to transmit the sensor data at a first frequency. Similarly, the control/monitoring device 48 may send a control signal that causes the controller to transmit data to an additional controller (i.e., a control system of the industrial automation system) at a second frequency that is relatively lower than the first frequency, and thus, modify the amount of data measured and transmitted by the sensors and/or processed by the controller. In this way, the control/monitoring device may reduce the amount of sensor data that is processed (e.g., batch processed) by a control system thereby enabling the control system to determine control actions more quickly as well as freeing resources that may be used by the control system for other operations.

Accordingly, the present disclosure relates to techniques for controlling and monitoring an industrial system based on identified signatures associated with unexpected operations of industrial automation components, equipment, and/or machines. As referred to herein, a "unexpected" operation includes measured data, processed sensor results, quality targets, and in any combination, that deviates from a baseline or modeled operation (e.g., an expected operation). In particular, the data used in the identified signature may include a processed sensor result, representing sensor data acquired by a sensor, such as a classification, a label, a model used by a device monitored by the sensor, and the like. In general, the signatures associated with unexpected operations may be utilized by an industrial automation system to identify correlations and/or root causes between operations of different components (e.g., whether part of the same machine, component, or equipment or different machine, component, or equipment). It is presently recognized that utilizing a processed sensor result may have a relatively smaller memory footprint thereby enabling a controller that is determining the correlations and/or root cause to more quickly identify correlations or root cause. Furthermore, the correlations may facilitate the retraining of models used to control the industrial system by providing a metric used to monitor performance of the model (i.e., the quality target and/or data indicating an unexpected operation). Accordingly, occurrences of the unexpected operation that are detected after the correlation or root cause is determined may be used to provide closed loop feedback of the models.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the embodiments described herein have been illustrated and described, many modifications and changes will occur to those skilled in the art. It is, therefore, to be understood that the appended claims are intended to cover all such modifications and changes as fall within the true spirit of the embodiments described herein

The invention claimed is:

1. A non-transitory computer-readable medium comprising computer-executable instructions that, when executed, are configured to cause a processing system to perform operations comprising:
   receiving a plurality of datasets corresponding to a plurality of processed results of raw sensor data obtained by a plurality of sensors;
   identifying a signature based on the plurality of datasets, wherein the signature indicates a quality target corresponding to a defect of one or more products resulting from an unexpected operation as compared to an expected operation related to equipment in an industrial automation system;
   determining a relationship between a first set of changes of a dataset of the plurality of datasets and a second set of changes in the dataset of the plurality of datasets indicating the expected operation, wherein the relationship indicates a probability that the first set of changes of the dataset are correlated with the quality target corresponding to the defect of the one or more products;
   determining that the probability exceeds a threshold; and
   modifying an operation of the equipment in the industrial automation system based on the relationship probability exceeding the threshold.

2. The non-transitory computer-readable medium of claim 1,
   wherein the instructions that, when executed, are configured to cause the processing system to modify the operation of the equipment comprise communicating with a controller configured to modify one or more operations of one or more industrial automation components of the industrial automation system.

3. The non-transitory computer-readable medium of claim 1, wherein the instructions that, when executed, are configured to cause the processing system to modify the operation of the equipment comprise:
   retrieving a model associated with controlling the operation of the equipment; and
   retraining one or more portions of the model based on the relationship.

4. The non-transitory computer-readable medium of claim 3, wherein the model comprises a decision tree, and wherein the instructions that, when executed, are configured to cause the processing system to retrain the one or more portions of the model comprise identifying one or more branches of the decision tree associated with the signature.

5. The non-transitory computer-readable medium of claim 3, wherein the model comprises a neural network, and wherein the instructions that, when executed, are configured to cause the processing system to retrain the one or more portions of the neural network comprise:
identifying one or more property layers of the neural network associated with the signature; and
updating the identified one or more property layers based on the modified operation.

6. The non-transitory computer-readable medium of claim 1, wherein the unexpected operation indicates a deviation between the expected operation and an actual operation of one or more devices of the industrial automation system.

7. The non-transitory computer-readable medium of claim 1, wherein the instructions that, when executed, are configured to cause the processing system to perform the operations comprising:
determining a machine component associated with the raw sensor data acquired by the sensor corresponding to the dataset of the plurality of datasets;
receiving contextual information identifying a machine including the machine component;
determining a hierarchy group of the machine component based on the contextual information; and
transmitting a control signal to the sensor that causes the sensor to transmit data associated with the raw sensor data to an additional device configured to process the data, the raw sensor data, or both, based on the hierarchy group.

8. A method, comprising:
receiving, via one or more processors, a plurality of datasets corresponding to a plurality of processed results of raw sensor data obtained by a plurality of sensors;
identifying, via the one or more processors, a signature based on the plurality of datasets, wherein the signature indicates a quality target corresponding to a defect of one or more products resulting from an unexpected operation as compared to an expected operation related to equipment in an industrial automation system;
determining, via the one or more processors, a relationship between a first set of changes of a dataset of the plurality of datasets and a second set of changes in the dataset of the plurality of datasets indicating the expected operation, wherein the relationship is a probability that the first set of changes of the dataset are correlated with the quality target corresponding to the defect of the one or more products;
determining that the probability exceeds a threshold; and
modifying, via the one or more processors, an operation of the equipment in the industrial automation system based on the probability exceeding the threshold.

9. The method of claim 8, wherein the signature comprises a data profile of the dataset of the plurality of datasets.

10. The method of claim 8, comprising:
receiving, via the one or more processors, an indication of the signature associated with the unexpected operation from an additional plurality of datasets;
determining, via the one or more processors, a portion of a model implemented by one or more devices of the one or more industrial automation system based on the signature; and retraining, via the one or more processors, the portion of the model.

11. The method of claim 8, wherein the dataset indicating the expected operation comprises a model indicating an expected combination of the plurality of datasets, and the quality target associated with a production of one or more products of the industrial automation system.

12. The method of claim 8, wherein modifying the operation of the industrial automation system based on the relationship comprises:
determining a remediation operation corresponding to the unexpected operation; and
transmitting a control signal that causes a controller to implement the remediation operation based on an occurrence of the unexpected operation.

13. The method of claim 8, wherein the signature comprises a value of data associated with the plurality of datasets, a pattern of the data, a set of changes of the data, a trend of the data, or a combination of the plurality of datasets.

14. A non-transitory computer-readable medium comprising computer-executable instructions that, when executed, are configured to cause a processing system to perform operations comprising:
receiving a plurality of datasets corresponding to a plurality of processed results of raw sensor data obtained by a plurality of sensors;
identifying a signature based on the plurality of datasets, wherein the signature indicates a quality target corresponding to a defect of one or more products resulting from an unexpected operation as compared to an expected operation related to equipment in an industrial automation system;
determining a relationship between a first set of changes of a dataset of the plurality of datasets and a second set of changes in the dataset of the plurality of datasets indicating the expected operation, wherein the relationship is a probability that the first set of changes of the dataset are correlated with the quality target corresponding to the defect of the one or more products;
determining that the probability exceeds a threshold;
modifying an operation of the equipment in the industrial automation system based on the probability exceeding the threshold;
retrieving a model associated with controlling the operation of the equipment; and
updating the model based on the relationship.

15. The non-transitory computer-readable medium of claim 14, wherein the relationship indicates a direct correlation, an indirect correlation, a linear correlation, or a nonlinear correlation between the unexpected operation and the plurality of datasets.

16. The non-transitory computer-readable medium of claim 14, wherein the plurality of datasets comprises a classification of the sensor data acquired by the plurality of sensors.

17. The non-transitory computer-readable medium of claim 14, wherein the signature indicates a deviation from baseline data corresponding to the expected operation.

18. The non-transitory computer-readable medium of claim 14, wherein one or more datasets of the plurality of datasets comprise a label indicating an operational state of the equipment of the industrial automation system.

* * * * *